United States Patent [19]

Bronner et al.

[11] Patent Number: 4,510,081
[45] Date of Patent: Apr. 9, 1985

[54] DRIFT CONTROL CONCENTRATE

[75] Inventors: James A. Bronner, Glendale; John D. Moore, Los Angeles; Paul R. Dale, La Crescenta, all of Calif.

[73] Assignee: Sanitek Products, Inc., Los Angeles, Calif.

[21] Appl. No.: 466,592

[22] Filed: Feb. 15, 1983

Related U.S. Application Data

[63] Continuation-in-part of Ser. No. 298,249, Aug. 31, 1981.

[51] Int. Cl.³ .................................................. C09K 3/28
[52] U.S. Cl. .................................. 252/603; 106/15.05; 204/DIG. 1; 252/607; 252/610
[58] Field of Search ............... 252/610, 611, 3, 601, 252/2, 8.05, 603; 71/65; 106/15.05; 204/DIG. 1

[56] References Cited

U.S. PATENT DOCUMENTS 3,957,658  5/1976  Chiesa, Jr. et al. ............... 252/3
3,984,334 10/1976  Hopper ............................ 252/610
4,155,741  5/1979  Scher et al. ...................... 252/310
4,170,637 10/1979  Pum ............................. 252/186.22
4,272,414  6/1981  Vandersall ....................... 252/602
4,342,665  8/1982  Itoh et al. ....................... 252/610

FOREIGN PATENT DOCUMENTS 0006753  2/1971  Japan ............................ 252/8.5 C
0019375  5/1971  Japan ............................ 252/8.5 C
0133392 10/1981  Japan ............................ 252/610

Primary Examiner—Ben R. Padgett
Assistant Examiner—Howard J. Locker
Attorney, Agent, or Firm—Fulwider, Patton, Rieber, Lee & Utecht

[57] ABSTRACT

A polymeric drift control concentrate is provided for admixture with an aqueous mixture designed for application to vegetation or soil by aerial or ground spraying or discharge. The concentrate reduces the likelihood that the water or aqueous mixture will drift away from its intended target, and suppresses the formation of dust on the ground.

6 Claims, No Drawings

DRIFT CONTROL CONCENTRATE

RELATED APPLICATION

This application is a continuation-in-part of application Ser. No. 298,249, filed Aug. 31, 1981.

BACKGROUND OF THE INVENTION

1. Field of the Invention

This invention relates to polymeric concentrates for use as a drift control additive to water or aqueous mixtures designed for application to vegetation or the earth by aerial or ground discharge or spraying, such as the discharge of fire retardants used to fight forest fires, the spraying of agricultural chemicals from aircraft or from the ground, and the spraying of aqueous preparations to suppress the formation of dust.

2. Description of the Prior Art

When water or aqueous mixtures of fire retardants are discharged from aircraft at high altitudes, the aqueous material tends to form a mist, which drifts away from the intended target area, due to the shearing forces of the wind and air currents. Similarly, when aqueous mixtures of agricultural chemicals are sprayed onto crops or land, many of the particles forming the spray are broken up into a mist, which tends to to drift away from the intended target. The presence of thickening agents in aerially applied materials has increased the particle size of the mist, but not sufficiently to prevent substantial drifting. This drifting problem results in waste and in potentially dangerous situations if the aqueous discharge or spray should drift into residential areas, water reservoirs, or highway traffic.

SUMMARY OF THE INVENTION

A novel drift control agent has been developed which significantly reduces the problem of drifting as aforesaid. This novel drift control agent comprises a concentrate for admixture with aqueous mixtures of fire retardants and agricultural chemicals, and is characterized by its ability to minimize drift as aforesaid, its stability and compatibility with said fire retardants and agricultural chemicals, its ease of handling and mixing, and its ability to suppress the formation of dust.

The concentrate of the present invention comprises a mixture of a water soluble polymer, or mixtures thereof, referred to as "Polymer 1," which will thicken and increase the viscosity of aqueous solutions thereof; and another water soluble polymer, or mixtures thereof, referred to as "Polymer 2," which will impart viscoelastic properties to aqueous solutions thereof. Viscoelasticity is the property of a liquid to be both viscous and elastic. The concentrate is in the form of particulate solids which are preferably ground to fine particle size and introduced into aqueous mixtures through the medium of an inert emulsifiable oil vehicle.

The presence of the concentrates of the present invention in the sprays or discharge of aqueous solutions or suspensions has been observed to provide droplets which resist the formation of a mist and thereby allows the droplets to fall onto their intended target area and in a distribution pattern which is more uniform than in the absence of said concentrates. Additionally, when said solutions or suspensions are discharged at high altitudes, as in the case of fire retardants, the aqueous material appears to stay together and its tendency to form a mist is materially reduced. Upon reaching the earth, the aqueous material does not cling to the tops of vegetation where it lands; but drips and runs off, penetrating the combustible underbrush. This drip and run effect is also observed during the aerial spraying of agricultural chemicals.

It has been observed that Polymer 2 is sensitive to salt solutions such as are found in agricultural chemical solutions and in some fire retardants and tends to react therewith to lessen its efficacy. However, the addition of Polymer 1, which is relatively insensitive to said salt solutions, renders the entire mixture of Polymer 1 and Polymer 2 relatively insensitive to said salt solutions. This is indeed surprising and demonstrates the unexpected beneficial results obtained by admixing Polymers 1 and 2 as aforesaid.

The novel drift control concentrate of the present invention has also been observed to remain effective even when admixed with hard or brackish water which may be used to make-up aqueous mixtures of fire retardants, agricultural chemicals or dust suppressants. This is an advantage over known commercial drift control compositions, which are adversely affected by hard or brackish water. Agricultural chemicals and dust suppressants made with the drift control concentrate of the present invention, have also been found not to clog spray nozzles. Clogging is a frequent complaint of competitive products. The drift control concentrate of the present invention has also been observed to go into solution much faster than competing products.

DESCRIPTION OF THE PREFERRED EMBODIMENTS

The preferred concentrate of the present invention generally comprises a mixture of Polymer 1 and Polymer 2 which constitutes about 10% to about 70% by weight of the concentrate, an emulsifier or mixture of emulsifiers which constitutes about 0.5% to about 50% by weight of the concentrate, a binder which constitutes about 0.5% to 5% by weight of the concentrate, and an inert oil vehicle in an amount so that the sum of the percentages of the ingredients comprising said concentrate totals 100%.

The mixture of Polymer 1 and Polymer 2 is formed by mixing said polymers at a ratio of about one to nine parts Polymer 1 to about nine parts to one part of Polymer 2.

Polymer 1 is a thickening agent and comprises a water soluble, high molecular weight polymer such as polysacchride, carboxy vinyl polymers, starch, starch derivatives, cellulose, cellulose derivatives, vegetable gums, and other vegetable substances or proteins and proteinaceous thickeners. Exemplary of such polymers suitable for use in the present invention are xanthan gum, carboxymethyl cellulose, guargum, and locust bean gum.

Polymer 2 is a high molecular weight water soluble polymer which imparts viscoelastic properties to water. Polymer 2 is preferably an anionic polyacrylamide, although non-ionic polyacrylamides may be used. Other suitable polymers which impart viscoelastic properties as aforesaid are polymers and copolymers of acrylic acid and methacrylic acid or their salts; polyacrylamides or methacrylamides, their copolymers, derivatives or mixtures thereof; polyacrylonitrile, its hydrolysis products, and copolymers, derivatives and mixtures thereof; or polymers of ethylene or alkylene oxides.

The emulsifier or surfactants used in the present invention preferably comprise an oil-in-water emulsifier which is soluble or dispersible in the neutral oil vehicle, and is capable of emulsifying, dispersing or solublizing the concentrate in water. The emulsifier may be anionic, nonionic, cationic, or mixtures thereof. A preferred emulsifier is either an octyl phenoxy polyethoxy ethanol containing 5 moles of ethylene oxide, or alternatively a 1:1 mixture of octyl phenoxy polyethoxy ethanol containing 5 moles ethylene oxide and polyethylene glycol 400 dioleate. Other suitable emulsifiers are well known to those skilled in the art and include: fatty alkanol amines, sulfonated amides or amines, ethoxylated or propoxylated amides or amines, amines and quaternary derivatives thereof, amine oxides, imidazlines, protein derivatives such as collagen or polypeptides, lignin derivatives, lecithin derivatives, sarcosine derivatives, betaine derivatives, lanolin derivatives, napthalene sulfonates, sulfo derivatives of succinates, sorbitan derivatives, alkyl sulfonates, sulfonated fatty esters, ETO thio ethers, fluorocarbons, phosphated derivatives, glycerol fatty esters, fatty esters including soaps, ethoxylated alkyl or aryl phenol sulfonates, sodium hydrocarbon sulfonates and alpha olefins, petroleum sulfonates, aryl and alkyl aryl sulfonates, diphenyl sulfonates, fatty ester sulfates, fatty acid sulfates and sulfonates, alcohol sulfates, ethoxylated alcohol sulfates and sulfonates, ethoxylated alkyl or aryl phenol sulfates, ethoxylated or propoxylated alcohols, ethoxylated fatty acids and glycerides, ethoxylated fatty sulfates, fatty glycols and polyethoxylated glycols, ether sulfates, amphoterics, and aliphatic bioethers.

When the concentrate of the present invention is added to so-called "long-term" fire retardant mixtures containing ammonium sulfate, or the like, a non-ionic emulsifier or surfactant is used in the concentrate in an effective amount to minimize the sensitivity between the concentrate and the ammonium sulfate.

The binder comprises an organophilic thickening agent, and is preferably silicon dioxide or organophilic clay or a mixture of both. Other suitable binders include: starches, cellulose derivatives, clays such as bentonites and other binders well known to those skilled in the art.

The vehicle comprises an oil which has a viscosity in the range of from about 35 to about 750 Saybolt Universal Seconds (SUS) at about 100 degrees F. and a solidification point of not greater than 20 degrees F. The oil is preferably a paraffinic base oil with a SUS of 149 at 100 degrees F. and a pour point of 16 degrees F. (−9 degrees C.). Any neutral vegetable or mineral oil with the specified viscosity and solidification point is suitable including diesel, paraffinic and naphthenic oils.

The oil may be buffered to maintain the pH of the oil concentrate mixture in the range from about 7 to about 9. The buffering agent is preferably citric acid; however, other buffering systems which are well known to those skilled in the art such as sulfamic acid and malic acid may be used.

In one preferred embodiment of the present invention, Polymer 1 comprises a high molecular weight polysacchride such as xanthan gum and Polymer 2 comprises an anionic polyacrylamide of molecular weight from about 2 to 3 million. The emulsifier is octyl phenoxy polyethoxy ethanol containing 5 moles ethylene oxide having an HLB of 10.4, or alternatively a 1:1 combination by weight of octyl phenoxy polyethoxy ethanol containing 5 moles ethylene oxide and of polyethylene glycol 400 dioleate having an HLB of 8.5. The binder is fumed silicon dioxide with a nominal particle size of 0.014 microns. The vehicle is a paraffinic base oil with a viscosity of 149 SUS at 100 degrees F. and a pour point of 16 degrees F. (−9 degrees C.) and is buffered with citric acid. Optionally, a preservative may be added to prolong shelf life of the concentrate.

In the aforesaid embodiment, the concentrate of the present invention comprises from about 10% to about 60% by weight xanthan gum; from about 10% to about 60% by weight high molecular weight (MW 2 to 3 million) anionic polyacrylamide; from about 0.5% to about 50% by weight emulsifier, which is either octyl phenoxy polyethoxy ethanol containing 5 moles ethylene oxide or a 1:1 combination of octyl phenoxy polyethoxy ethanol containing 5 moles ethylene oxide and polyethylene glycol 400 dioleate; from about 0.5% to about 5% by weight organophilic clay binder; from about 0.5% to about 5% by weight silicon dioxide; from about 30% to about 90% by weight paraffinic base oil with an SUS of 149 at 100 degrees F. and a pour point of 16 degrees F. (−9 degrees C.), buffered with citric acid to a pH range of about 7 to about 9, in a concentration of about 0.1% to about 5% by weight citric acid; and optionally comprising from about 0.2% to about 5% by weight preservative.

In the preferred embodiment of the present invention, the concentrate is prevented from separating on storage by admixture with a shear activated suspending agent. This agent increases the viscosity of the concentrate on storage to inhibit the solids in the concentrate from settling when at rest, but allows the viscosity of the concentrate to decrease and the concentrate to flow upon the application of a relatively small amount of shear, such as by gentle agitation when attempting to pour the concentrate.

The shear activated suspending agent is fumed silicon dioxide, organophilic clay or other like functionally equivalent materials, which may be added in the amount of about 0.5% to 10% by weight of oil vehicle for silicon dioxide, to about 1% to about 12% by weight of oil vehicle for organophilic clay. The oil vehicle and shear activated suspending agent are admixed until the viscosity is between about 2000 to 14000 centipoise during mixing. At this level of viscosity, the solids are inhibited from settling on storage, and the concentrate is pourable upon gentle agitation.

When mixed with a fire retardant or agricultural chemical solution or suspension, the concentrate is easily and uniformly dispersed therein by agitation with mixing devices such as an inline eductor, an aspirator, or a high lighting-type mixer or agricultural spray system.

The concentrate is added to said fire retardants in amounts to produce a mixture containing from about 0.1% to about 4% by weight of concentrate.

When used with agricultural chemicals, the concentrate can be added in amounts as little as about 0.01% by weight of the total mixture to produce a spray with uniform droplet size that will resist drift. The efficacy of the drift control concentrate at such low levels is indeed surprising, particularly since the minimum concentrate required by competitive drift control concentrates is required to be substantially greater. This surprising finding is believed to be due to a synergistic reaction between Polymer 1 and Polymer 2, which to applicants' knowledge, have never been admixed before for the purpose of manufacturing a drift control agent.

The upper limit of concentrate when used with agricultural chemicals will depend upon the type of spray equipment used, the size of the spray nozzle, and the spray pressure. However, with ordinary aircraft spray equipment operating under normal conditions, the upper limit appears to be about 0.2% by weight of the total mixture. If the concentrate exceeds the aforesaid 0.2% upper limit, the mixture will tend to come out of the spray apparatus as a stream, rather than a spray.

When used as a dust suppressant, the concentrate is added to water to produce a mixture containing about 0.2% to about 1% by weight of concentrate. Once mixed, the aqueous mixture containing said concentrate may be loaded into tanks by conventional means for spraying or for discharge.

The emulsifiers, binders, and oil vehicles used in the preferred embodiment herein are not essential to the preparation of the concentrate of the present invention; but are used as a matter of convenience because they facilitate the introduction and dispersion of the concentrate into the aqueous material to be sprayed or discharged. Accordingly, the concentrate of the present invention is also intended to cover mixtures of Polymer 1 and Polymer 2 only, which may be dispersed in aqueous mixtures without the use of emulsifiers, binders, oil vehicles, and shear activated suspending agents.

The following examples illustrate the invention.

EXAMPLE 1

A concentrate for use in an aqueous fire retardant mixture comprises the following:

| | Weight % |
|---|---|
| Xanthan gum | 25.25 |
| Anionic polyacrylamide having a molecular weight of 2 to 3 million | 20.0 |
| Octyl phenoxy polyethoxy ethanol containing 5 moles ethylene oxide | 0.75 |
| Polyethylene glycol 400 dioleate | 0.75 |
| Organophilic clay | 0.75 |
| Neutral oil | 50.5 |
| Citric Acid | 2.0 |

The ingredients were mixed together under strong agitation to form the concentrate.

EXAMPLE 2

A concentrate for use in an aqueous mixture of agricultural chemicals comprises the following:

| | Weight % |
|---|---|
| Separan AP273 | 30.0 |
| Xanthan Gum | 20.0 |
| 150 Neutral Oil | 44.3 |
| Claytone 40 | 0.3 |
| Cab-o-sil M5 | 1.2 |
| Triton X-45 | 3.0 |
| Citric Acid | 1.0 |
| Dowicil 75 | 0.2 |

Separan AP273 is the trade name of Dow Chemical for its high molecular weight (2 to 3 million) anionic polyacrylamide.

150 Neutral Oil is the trade name of Union Oil for its solvent-refined paraffin base neutral oil.

Claytone 40 is the trade name of Southern Clay Products for an organo-clay complex formed by the reaction of high molecular weight organic cations with a highly refined Wyoming bentonite.

Cab-o-sil M5 is the trade name of Cabot Corp. for silicon dioxide ("fumed silica") with a nominal particle size of 0.014 microns.

Triton X-45 is the trade name of Rohm Haas for octyl phenoxy polyethoxy ethanol containing 5 moles ethylene oxide.

Dowicil 75 acts as a preservative and is the trade name of Dow Chemical for 1-(3-chloroally)-3,5,7-triaza-1-azoniaadamantane chloride [$CH_6H_{12}N_4(CH_2CHCHCl)Cl$].

EXAMPLE 3

A concentrate for use in an aqueous fire retardant mixture comprises the following:

| | Weight Percent |
|---|---|
| Separan AP273 | 34.0 |
| Xanthan Gum | 24.0 |
| Golden Bear Oil #1108 | 37.8 |
| Claytone 40 | 0.4 |
| Emerest #2648 | 0.4 |
| Amyl Acetate | 0.2 |
| Triton N101 | 0.2 |
| Triton X-45 | 0.4 |
| Citric Acid | 2.6 |

The ingredients Separan AP273, Claytone 40, and Triton X-45 are as previously identified by composition and source.

Golden Bear Oil #1108 is the trade name of Witco Chemical Company for its neutral naphtenic oil.

Emerest #2648 is the trade name of Emery Chemical for its polyethylene glycol 400 dioleate.

Amyl Acetate acts as a fragrance and solvent.

Triton N101 acts as an emulsifier and is the trade name of Rohm & Haas for its nonyl phenoxy polyethoxy ethanol.

In formulating the concentrate, the ingredients were added under strong agitation and in the follow order: Golden Bear Oil #1108, Triton N101, Amyl Acetate, Emerest #2648, Triton X-45, Claytone 40, Xanthan Gum, Citric Acid, and Separan AP273.

The concentrate, after standing overnight, set up to give a firm gel which held the larger particles in permanent suspension. Introduction of shear by means such as stirring or pumping caused reduction in the viscosity of the gel such that it could be pumped through a small orifice, enabling it to be mixed with water to give an aqueous suspension using a mixing system such as an inline eductor.

While the embodiments of the invention chosen herein for purposes of disclosure are considered to be preferred, it is to be understood that this invention is intended to cover all changes and modifications in the disclosed embodiments which fall within the spirit and scope of the invention.

We claim:

1. A drift control concentrate admixed with an aqueous fire retardant preparation for application to vegetation or soil by aerial spraying or discharge and characterized by the admixture's ability to remain effective when made with hard or brackish water, by the admixture's ability not to clog spray nozzles, and by the concentrate's relative ease of solution into aqueous preparations, said concentrate consisting essentially of a mixture of effective amounts of a water soluble polymer, or mixtures of said polymer, which will increase the viscosity and thicken said aqueous preparation, and effective amounts of a water soluble polymer, or mixtures thereof, which will impart viscoelasticity to said aqueous preparation, wherein said viscoelasticity increasing polymer is selected from the group consisting of:
  (a) Polyacrylamides or their copolymers or derivatives,
  (b) Polymers and copolymers of acrylic acid and methacrylic acid or their salts,
  (c) Polymethacrylamides or their copolymers or derivatives,
  (d) Polyacrylonitriles, their hydrolysis products, copolymers, or derivatives; and
  (e) Polymers of ethylene or alkylene oxide.

2. A drift control concentrate admixed with an aqueous preparation of agricultural chemicals for application to vegetation or soil by aerial spraying or discharge and characterized by the admixture's ability to remain effective when made with hard or brackish water, by the admixture's ability not to clog spray nozzles, and by the concentrate's relative ease of solution into aqueous preparations, said concentrate consisting essentially of a mixture of effective amounts of a water soluble polymer, or mixtures of said polymer, which will increase the viscosity and thicken said aqueous preparation, and effective amounts of a water soluble polymer, or mixtures thereof, which will impart viscoelasticity to said aqueous preparation, wherein said viscoelasticity increasing polymer is selected from the group consisting of:
  (a) Polyacrylamides or their copolymers or derivatives,
  (b) Polymers and copolymers of acrylic acid and methacrylic acid or their salts,
  (c) Polymethacrylamides or their copolylmers or derivatives,
  (d) Polyacrylonitriles, their hydrolysis products, copolymers, or derivatives, and
  (e) Polymers of ethylene or alkylene oxide;

3. A drift control concentrate admixed with an aqeous preparation for use as a dust suppressant applied by aerial spraying or discharge and characterized by the admixture's ability to remain effective when made with hard or brackish water, by the admixture's ability not to clog spray nozzles, and by the concentrate's relative ease of solution into aqueous preparations, said concentrate consisting essentially of a mixture of effective amounts of water soluble polymer, or mixtures of said polymer, which will increase the viscosity and thicken said aqueous preparation, and effective amounts of a water soluble polymer, or mixtures thereof, which will impart viscoelasticity to said aqueous preparation, wherein said viscoelasticity increasing polymer is selected from the group consisting of:
  (a) Polyacrylamides or their copolymers or derivatives,
  (b) Polymers and copolymers of acrylic acid and methacrylic acid or their salts,
  (c) Polymethacrylamides or their copolymers or derivatives,
  (d) Polyacrylonitriles, their hydrolysis products, copolymers, or derivatives; and
  (e) Polymers of ethylene or alkylene oxide.

4. A drift control concentrate admixed with an aqueous fire retardant preparation for application to vegetation or soil by aerial spraying or discharge and characterized by the admixture's ability to remain effective when made with hard or brackish water, by the admixture's ability not to clog spray nozzles, and by the concentrate's relative ease of solution into aqueous preparations, said concentrate consisting essentially on a weight basis, of
  about 10% to about 70% of a polymer mixture having about one to 9 parts of a water soluble polymer or mixture of said polymers which will increase the viscosity and thicken the aqueous preparation, and about 9 parts to about one part of a water soluble polymer or mixture of said polymers which will impart viscoelasticity to said aqueous preparation, wherein said viscoelasticity increasing polymer is selected from the group consisting of:
    (a) Polyacrylamides or their copolymers or derivatives,
    (b) Polymers and copolymers of acrylic acid and methacrylic acid or their salts,
    (c) Polymethacrylamides or their copolymers or derivatives,
    (e) Polymers of ethylene or alkylene oxide;
  about 0.5 to about 50% of a surfactant, and
  oil in an amount to make the sum of the percentages of the ingredients comprising said concentrate, total 100%.

5. A drift control concentrate admixed with an aqueous preparation of agricultural chemicals for application to vegetation or soil by aerial spraying or discharge and characterized by the admixture's ability to remain effective when made with hard or brackish water, by the admixture's ability not to clog spray nozzles, and by the concentrate's relative ease of solution into aqueous preparations, said concentrate consisting essentially, on a weight basis, of
  about 10% to about 70% of a polymer mixture having about one to 9 parts of a water soluble polymer or mixture of said polymers which will increase the viscosity and thicken the aqueous preparation, and about 9 parts to about one part of a water soluble polymer or mixture of said polymers which will impart viscoelasticity to said aqueous preparation, wherein said viscoelasticity increasing polylmer is selected from the group consisting of:
    (a) Polyacrylamides or their copolymers or derivatives,
    (b) Polymers and copolymers of acrylic acid and methacrylic acid or their salts,
    (c) Polymethacrylamides or their copolymers or derivatives,
    (d) Polyacrylonitriles, their hydrolysis products, copolymers, or derivatives, and
    (e) Polymers of ethylene or alkylene oxide,
  about 0.5 to about 50% of a surfactant, and
  oil in an amount to make the sum of the percentages of the ingredients comprising said concentrate, total 100%.

6. A drift control concentrate admixed with an aqueous preparation for use as a dust suppressant applied by aerial spraying or discharge and characterized by the admixture's ability to remain effective when made with hard or brackish water, by the admixture's ability not to clog spray nozzles, and by the concentrate's relative ease of solution into aqueous preparations, said concentrate consisting essentially, on a weight basis, of
  about 10% to about 70% of a polymer mixture having about one to 9 parts of a water soluble polymer or mixture of said polymers which will increase the viscosity and thicken the aqueous preparation, and about 9 parts to about one part of a water soluble polymer or mixture of said polymers which will impart viscoelasticity to said aqueous preparation, wherein said viscoelasticity increasing polymer is selected from the group consisting of:
(a) Polyacrylamides or their copolymers or derivatives,
(b) Polymers and copolymers of acrylic acid and methacrylic acid or their salts,
(c) Polymethacrylamides or their copolymers or derivatives,
(d) Polyacrylonitriles, their hydrolysis products, copolymers, or derivatives, and
(e) Polymers of ethylene or alkylene oxide,
about 0.5 to about 50% of surfactant, and
oil in an amount to make the sum of the percentages of the ingredients comprising said concentrate, total 100%.

* * * * *